(12) United States Patent
Mulder et al.

(10) Patent No.: US 6,286,870 B1
(45) Date of Patent: Sep. 11, 2001

(54) TRACTOR AXLE MOUNTED TANK SYSTEM

(75) Inventors: Brent Mulder, Boyden; Ryan Mulder, Sheldon, both of IA (US)

(73) Assignee: Dethmers Manufacturing Company, Boyden, IA (US)

( * ) Notice: Subject to any disclaimer, the term of this patent is extended or adjusted under 35 U.S.C. 154(b) by 0 days.

(21) Appl. No.: 09/524,438

(22) Filed: Mar. 14, 2000

(51) Int. Cl.[7] .................................................. B60P 3/22
(52) U.S. Cl. ...................................... 280/833; 280/830
(58) Field of Search ................................ 280/834, 833, 280/830

(56) References Cited

U.S. PATENT DOCUMENTS

| | | | |
|---|---|---|---|
| 2,743,934 | * | 5/1956 | Chambers et al. ................... 280/833 |
| 3,311,183 | * | 3/1967 | Phillips ................................. 280/833 |
| 3,900,201 | * | 8/1975 | Johnson et al. ....................... 280/833 |
| 4,149,734 | * | 4/1979 | Sylvester ............................... 280/833 |
| 4,351,535 | * | 9/1982 | Mead ..................................... 280/830 |

* cited by examiner

*Primary Examiner*—Brian L. Johnson
*Assistant Examiner*—Matthew Luby
(74) *Attorney, Agent, or Firm*—Brian J. Laurenzo; Michael C. Gilchrist

(57) ABSTRACT

An apparatus for mounting a tank to a tractor. In one embodiment, the invention comprises a drum attachable to a rear axle of the tractor, the rear axle having a longitudinal axis of rotation, a spindle connectable to the drum along the longitudinal axis of the rear axle so that the drum can rotate with respect to the spindle, and a support structure connected to the spindle and connectable to the body of the tractor, wherein the support structure is adapted to mount a tank substantially adjacent a rear wheel of the tractor.

20 Claims, 4 Drawing Sheets

US 6,286,870 B1

TRACTOR AXLE MOUNTED TANK SYSTEM

TECHNICAL FIELD

This invention relates to devices and methods for mounting tank systems to tractors. More particularly, this invention relates to apparatuses and methods for mounting side tanks to the rear axle of a tractor.

BACKGROUND

Tanks may be used for a variety of purposes with tractors, including storage of fuel, chemicals, fertilizers, pesticides, and the like. Because large amounts of fuel or chemicals may be used during agricultural processes, it is desirable to allow for the mounting of large tanks to tractors so that the tractor operator will be able to more efficiently accomplish a task.

Several types of brackets and mounting systems are available to mount tanks to tractors. Typical tank mounting systems attach tanks to the side frame of the tractor so that the tanks are mounted substantially near the front axle and tires of the tractor. U.S. Pat. No. 2,743,934, issued to Chambers et al. on May 1, 1956, and U.S. Pat. No. 4,149,734, issued to Sylvester on Apr. 17, 1979, disclose such tractor tank mounting apparatuses. U.S. Pat. No. 3,311,183, issued to Phillips, discloses another tractor tank mounting apparatus that does not mount tanks to tractors in the most feasible manner.

Most prior art tank mounting devices, as noted above, mount the tanks substantially near the front axle and tires of the tractor so that the majority or a substantial portion of the weight of the tanks rests on the front axle and tires of the tractor. Several problems result from mounting tanks in such a manner. The front tires of tractors, which are typically much smaller than the rear tires, are not designed to carry as much weight as the rear tires. The typical placement of tanks near the front axle, therefore, place an undue amount of weight on the front axle and tires of the tractor. Not only does this increase the chance of malfunction of the front tires and axle, but it limits the size of the tanks that may be mounted to the tractor. If large tanks are mounted to the side of the tractor, tire manufacturer and tractor manufacturer maximum weight recommendations may well be exceeded.

A need exists for a tractor tank mounting apparatus that mounts a tank so that a substantial portion of the weight of the tank rests on the rear axle and tires of the tractor, so that the tractor operator has a clear field of vision, and so that a sufficiently large tank may be mounted to the tractor to aid in the efficiency of tractor operation.

SUMMARY

One embodiment of the invention is an apparatus for mounting a tank to a tractor. In this embodiment, the invention comprises a drum attachable to a rear axle of the tractor, the rear axle having a longitudinal axis of rotation, a spindle connectable to the drum along the longitudinal axis of the rear axle so that the drum can rotate with respect to the spindle, and a support structure connected to the spindle and connectable to the body of the tractor, wherein the support structure is adapted to mount a tank substantially adjacent a rear wheel of the tractor.

Another embodiment of the invention is an apparatus for mounting a tank to the rear axle of a tractor. In this embodiment, the invention comprises a first drum attachable to a first end of the rear axle and a second drum attachable to a second end of the rear axle, the rear axle having a longitudinal axis of rotation, a first spindle connectable to the first drum along the longitudinal axis of the rear axle so that the rear axle can rotate with respect to the first spindle, and a second spindle connectable to the second drum along the longitudinal axis of the rear axle so that the rear axle can rotate with respect to the second spindle, and a support structure connected to the first spindle, the second spindle, and the tractor body, wherein the support structure is adapted to mount a first tank substantially adjacent a first rear wheel of the tractor and a second tank substantially adjacent a second rear wheel of the tractor.

Yet another embodiment of the invention is a method for mounting a tank to the rear axle of a tractor. In this embodiment, the invention comprises attaching a drum to the rear axle, connecting a spindle to the drum such that the drum can rotate with respect to the spindle, wherein a support structure is connected to the spindle, and mounting a tank to the support structure substantially adjacent a rear wheel of the tractor so that the rear wheels of the tractor bear a majority of the weight of the tank.

The above embodiments of the invention have numerous advantages. An advantage of the present invention as described above is that it enables a substantial portion or a majority of the weight of the tanks to be carried by the rear axle and tires of the tractor, thus alleviating the stress cause by large weights on the front axle and tires of the tractor. Another advantage is that the tanks may be increased in size due to the weight distribution of the tanks on the rear axle and front axle (a substantial portion of the weight being on the rear axle).

Other features and advantages of the mounting apparatuses and methods of the present invention will become more fully apparent and understood with reference to the following description and drawings, and the appended claims.

BRIEF DESCRIPTION OF THE DRAWINGS

DETAILED DESCRIPTION a. General Overview and Equipment of an Embodiment of the Invention A number of embodiments of the invention are shown in FIGS. 1–4. FIG. 1 depicts a top view of a tractor having a tractor body 10, rear tires 12, a rear axle 14, and front tires 16 and a front axle 18. FIG. 1 also depicts the apparatus of one embodiment of the invention, which includes a drum 20, a spindle 22 connected to the drum 20 so that the drum 20 can rotate with respect to the spindle 22, and a support structure 24. In general, the drum 20 is attachable to the rear axle 14 of the tractor, typically through the rim of the rear tire 12, and the spindle 22 is connected to the drum 20 so that the drum 20 and rear axle 14 can rotate with respect to the spindle 22. The support structure 24, upon which the tanks 50 may be mounted, is then rigidly attached to the spindle 22. In operation, therefore, as the rear tires 12 and rear axle 14 rotate, the support structure 22 remains in a set position with respect to the tractor body 10 and may be used to mount tanks 50 to the tractor. Because the drum 20 and spindle 22 are connected to the rear axle 14 of the tractor, a substantial portion of the weight of the tanks 50 is supported by the rear axle 14 and rear tires 12 of the tractor. One embodiment of the invention, therefore, may be a method for securing side mount tanks 50 to the rear axle 14 of the tractor.

1. Attachment of the Support Structure to the Rear Axle

Figure 3:
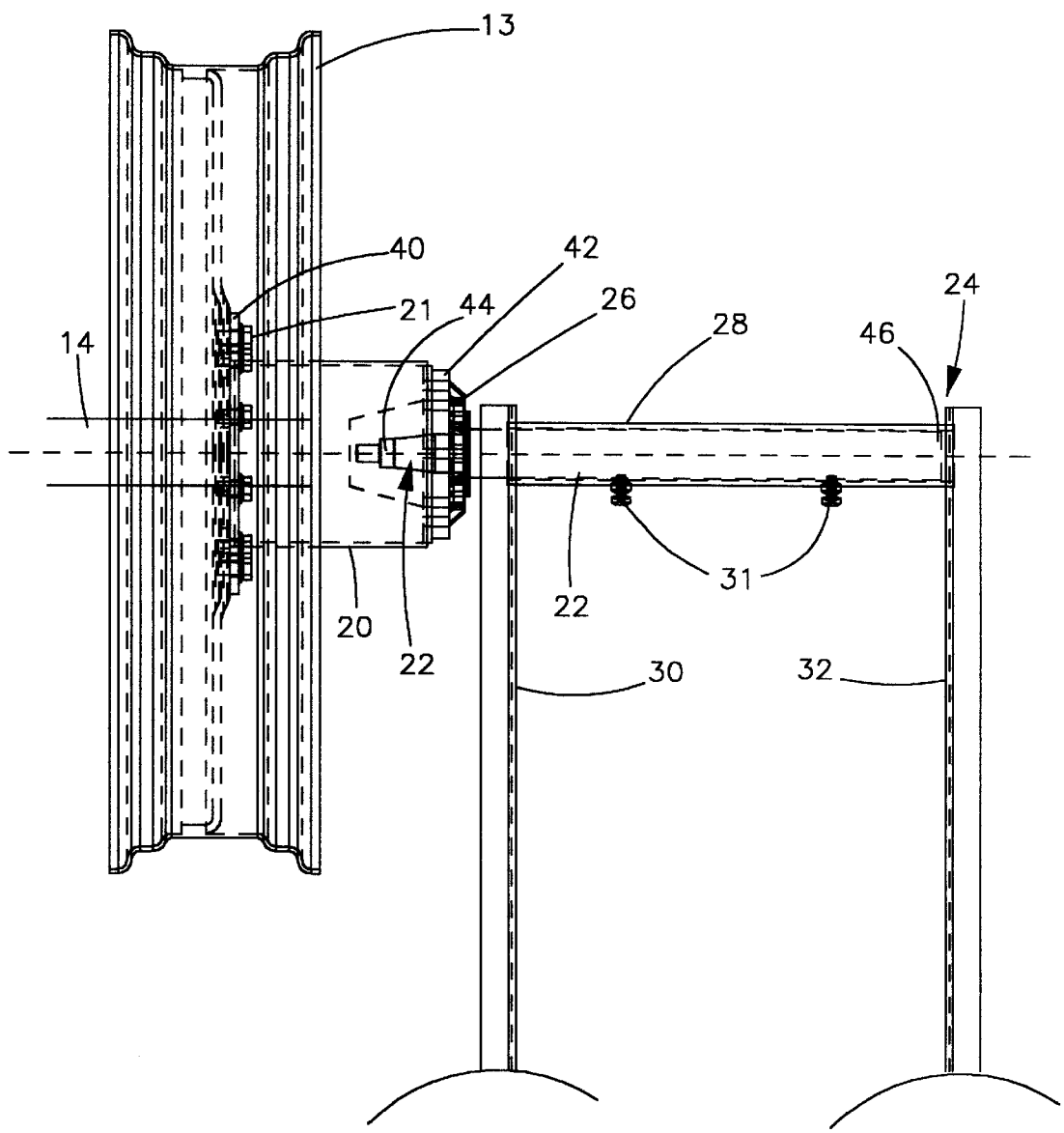
FIG. 3 is a top view of one embodiment of the apparatus of the invention connected to a rim of the tractor.

FIG. 3 depicts a top view of one embodiment of the connection of the support structure 24 of the invention to the rear axle 14 of the tractor. In the embodiment of FIG. 3, the support structure 24 is mounted with a drum 20, hub 26, and spindle 22 to the rim 13 of the rear tractor tire 12 (the tire 12 is not shown in FIG. 3). In the embodiment of FIG. 3, the rear axle 14 has a longitudinal axis x, which extends substantially parallel to the ground below the tractor. The drum 20 attaches to the rim 13 of the rear tractor axle 14. The drum 20 may be fixedly attached using any fastener or device known to those skilled in the art, including the bolts 21 shown in FIG. 3, which may be the same bolts 21 that typically attach the rim 13 to the axle 14. The drum 20 may be of any shape and may be made from any rigid material, such as stainless steel. The drum 20 of FIG. 3 is substantially cylindrical in shape (see FIG. 4) with a longitudinal axis x, and the drum 20 may include a mounting plate 40 attached at one end and a face plate 42 at the other end. The mounting plate 40 may be attached with the bolts 21 to the rear rim 13. The face plate 42 contains attachments and the like so that it may be used to attach the drum 20 to the remainder of the mounting apparatus. The drum 20 may be substantially hollow, although a portion of it may also be solid.

Mounted partially within the drum 20 and extending into the support structure 24 is the spindle 22. The spindle 22 may be mounted within the drum 20 so that the drum 20 may rotate around axis x with respect to the spindle 22. The spindle 22 may be mounted within the drum 20 in any manner known to those skilled in the art. In the embodiment depicted in FIGS. 1 and 3, the spindle 22 is mounted within the drum 20 using a hub 26, which may be any type of bearing used in the art. In one embodiment, the hub 26 may be fixedly attached to the drum 20 so that the drum 20 and hub 26 rotate with respect to the spindle 22. In another embodiment, the spindle 22 may be fixedly attached to the hub 26 so that the drum 20 rotates with respect to both the hub 26 and the spindle 22. In these embodiments, the spindle 22 may be stationary with respect to a fixed reference point so that the spindle 22 may be used for connection to a support structure 24 for a tank. The hub 26 shown in FIGS. 1 and 3 extends into the drum 20 and may be attached to the face plate 42 of the drum 20 using any type of securing device known to those skilled in the art. The spindle 22 may be mounted partially within the drum 20, as shown in FIG. 3. The hub 26 may contain one or more bearings of various types situated in different positions so that the spindle 22 may rotate with respect to the drum 20. Ball bearings or any other type of bearings may be used. In the embodiment of FIG. 3, the hub 26 may be fixedly attached to the drum 20 using bolts, screws, welding, or any type of connector or fastener known to those skilled in the art.

In an embodiment of the invention that does not use a hub, any type of bearing device may be attached to the spindle 22 so that the drum 20 may rotate (with the axle) with respect to the spindle 22. The spindle 22, therefore, does not rotate with respect to a fixed object, and the spindle 22 may be used for the mounting of a support structure 24.

Figure 1:
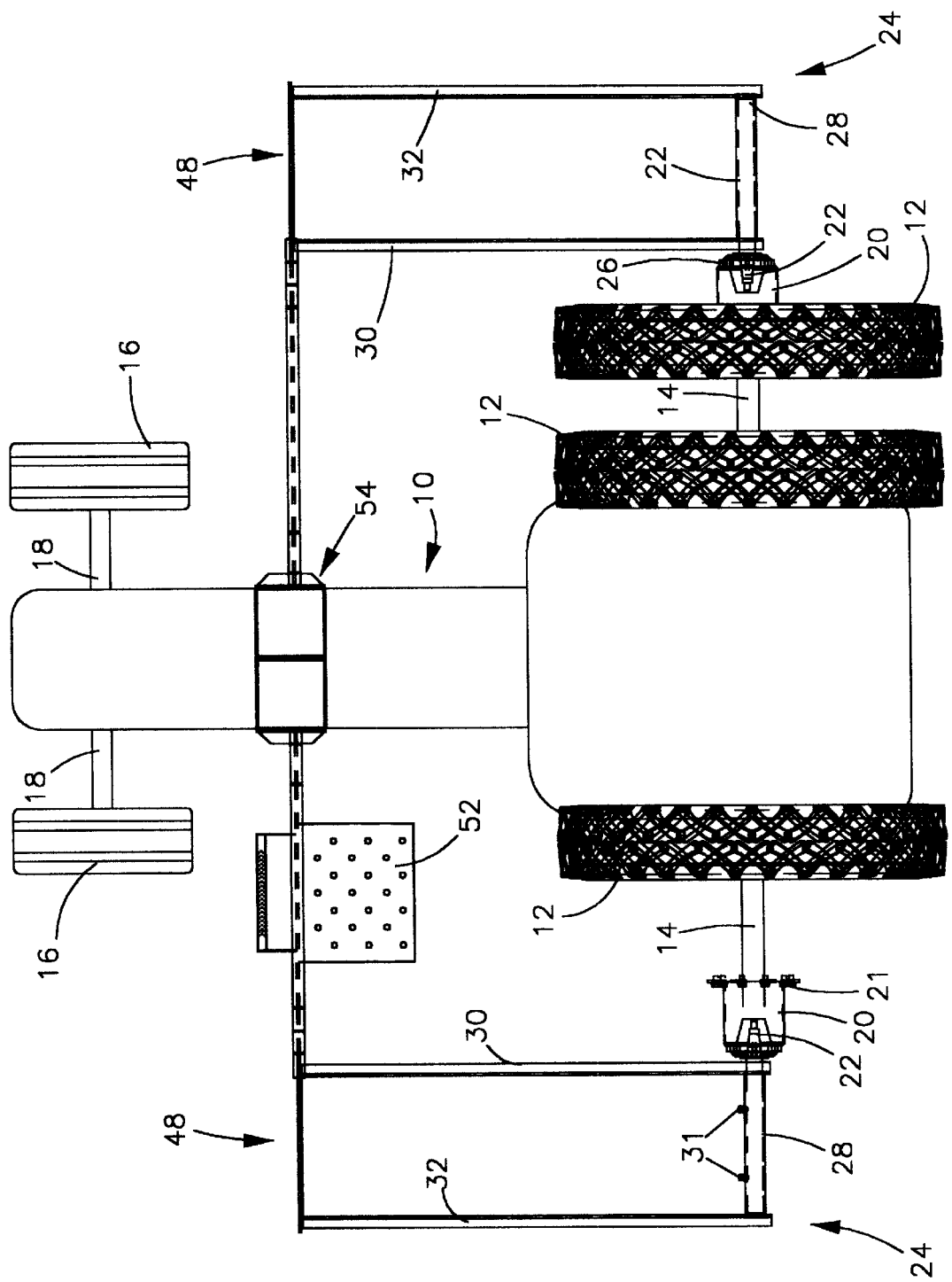
FIG. 1 is a top view of a tractor with one embodiment of the apparatus of the invention mounted thereto.

The spindle 22 extends from within the drum 20 or substantially adjacent the drum 20 and hub 26 at a first end 44 to a second end 46 that is near the far end of the support structure 24 from the tractor. The spindle 22 may be a substantially cylindrical or tubular member of any variety having a longitudinal axis x, and the spindle 22 may be either solid, partially solid, or substantially hollow. The support structure 24 may be mounted to the spindle 22 using any type of fastener or connector known to those skilled in the art, including the set screws 31 shown in FIGS. 1 and 3. In the embodiment of FIGS. 1 and 3, the spindle 22 is fixedly attached to the support structure 24, and more specifically, the spindle 22 extends within a tube 28 of the support structure 24 and is fixedly secured to the tube 28 using one or more set screws 31.

2. The Support Structure

Figure 2:
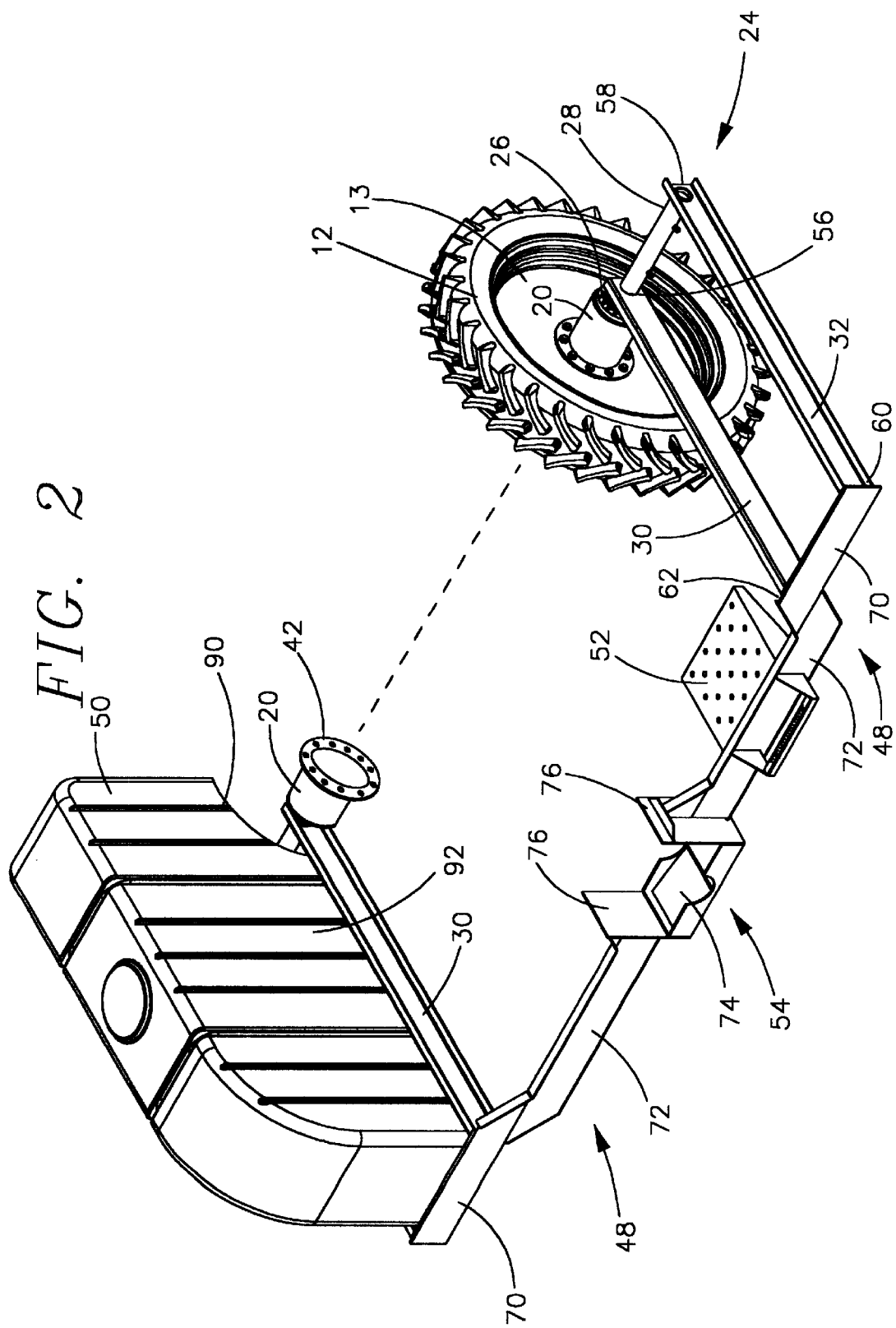
FIG. 2 is a perspective view of the apparatus of one embodiment of the invention mounted to the rear tire rim of a tractor.

The support structure 24 of one embodiment of the invention may be seen in FIGS. 1–4 and may be best viewed in FIGS. 1 and 2. The support structure 24 may have virtually any orientation with respect to the spindle 22, drum 20, and hub 24 of the invention. In general, the support structure 24 connects to the spindle 22 and one other location along the body 10 or other portion of the tractor so that the tanks 50 may be mounted to the support structure 24. In general, therefore, the support structure 24 may be of any variety of shapes and configurations such that it may be mounted to the spindle 22 and body 10 of the tractor for the mounting of tanks 50.

The embodiments shown in FIGS. 1–4 depict a support structure 24 having arms 30, 32 that extend substantially parallel to the ground and the body 10 of the tractor. The arms 30, 32 depicted in FIGS. 1–4 are substantially perpendicular to the spindle 22, although in other embodiments the arms 30, 32 do not have to be perpendicular to the spindle 22. In other embodiments, the arms 30, 32 of the support structure 24 may extend vertically from the spindle 22 rather than horizontally, and the tanks 50 may then be mounted substantially above the rear axle 14 and tire 12 rather than substantially adjacent and along the side of the tires 12 as shown in FIG. 2.

As shown in FIGS. 1 and 2, the support structure 24 may have a tube 28, as described above, one or more arms 30, 32, and a body engaging structure 48. The tube 28, as described above, may be used to attach the support structure 24 to the spindle 22, and the tube 28 may be of substantially any shape. The tube 28 shown in FIGS. 1–4 is substantially cylindrical in shape with a longitudinal axis x, and the tube 28 is hollow such that the spindle 22 fits within the tube 28. In other embodiments, the tube 28 could be rectangular in shape.

Figure 4:
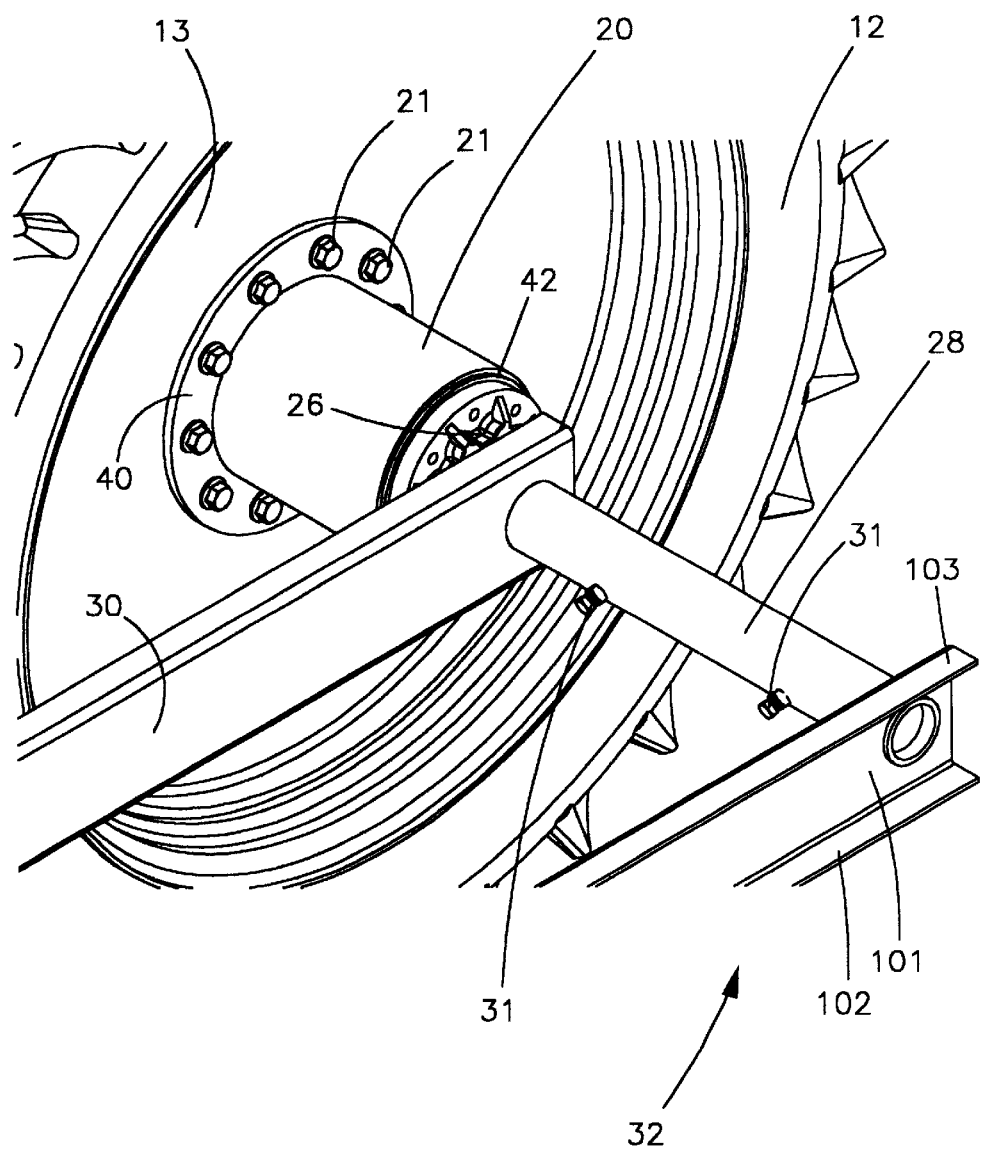
FIG. 4 is a perspective view of one embodiment of the apparatus of the invention connected to a rim of the tractor.

The arms 30, 32 extend from the tube 28 to form a support area for the tanks 50. Any number of arms 30, 32 may be used for support of the tanks 50. FIGS. 1 and 2 depict two arms 30, 32, with arm 30 being an inner arm near rear tire 12 and arm 32 being an outer arm that is spaced at a distance from arm 30. The arms 30, 32 may be of any variety of geometries, such as the rectangular shape depicted in FIGS. 1–4, or tubular or cylindrical shapes. As best seen in FIG. 4, the arms 30, 32 may have a main support 101, a bottom support 102, and a top support 103 that are connected together to form the arm 30, 32. In the embodiment of FIGS. 1 and 2, the arms 30, 32 extend longitudinally substantially parallel to the body 10 of the tractor and to the ground. The arms 30, 32, therefore, may be substantially perpendicular to the tube 28 and the spindle 22, although the arms 30, 32 need not be substantially perpendicular to the tube 28 and spindle 22. The first ends 56, 58 of the arms 30, 32 may be fixedly attached to the tube 28 by any method known to those skilled in the art, including welding, riveting, bolting, and the like. The second ends 60, 62 of the arms 30, 32 may be attached to the body engaging structure 48 so that a platform or area for mounting a tank 50 exists.

The body engaging structure 48 extends toward the body 10 of the tractor and contains an engaging portion 54 that attaches to the body 10 of the tractor to form a second support for the support structure 24 (the first support being the rear axle 14 connection). The engaging portion 54 may be of virtually any shape or configuration know to those skilled in the art and may be used to connect the body engaging structure 48 by any method to some portion of the body 10 of the tractor. In the embodiment of FIG. 2, the body engaging structure 48 is substantially parallel to the tube 28 and extends from the second arm 32 to the first arm 30 and then toward the body 10 of the tractor. FIG. 2 depicts a body engaging structure 48 that contains an upper portion 70 and a lower portion 72 connected together. Although this embodiment may be used, the body engaging structure 48 may be one continuous member.

In one embodiment, the body engaging structure 48 may simply be a beam or rod that extends from the second arm 32 to the body 10 of the tractor and attaches thereto by any method known to those skilled in the art. In the embodiment shown in FIG. 2, in which tanks 50 may be mounted on both sides of the tractor body 10, the engaging portion 54 may contain a bottom member 74 and two side members 76. The side members 76 may have a reinforced connection to the lower portion 72 of the body engaging structure 48. The bottom member 74 may be one or more pieces rigidly attached to the side members 76. The bottom member 74 and the side members 76 may be attached to the body 10 of the tractor in any manner known to those skilled in the art, including screws, bolts, rivets, welding, and the like.

The embodiments shown in FIGS. 1 and 2 depict mounting apparatuses of the invention extending from both of the sides of the body 10 of the tractor. Each end of the rear axle 14, therefore, has a drum 20, spindle 22, and support structure 24 extending therefrom such that a tank 50 may be mounted on each side of the tractor body 10. In one embodiment, the drum 20, spindle 22, support structure 24, and the remaining elements that may be used in the invention may be identical or similar on both sides of the tractor body 10. In other embodiments, the support structures 24 on each side of the body 10 may be of different sizes for different size tanks 50, or the drum 20, spindle 22, and other elements may be of different shapes or configurations without departing from the scope of the invention. In an embodiment in which support structures 24 for tanks 50 exist on each side of the tractor body 10, the body engaging structure 48 with the engaging portion 54 may be a continuous member attaching to the body 10 of the tractor, although the body engaging structure 48 may also be two or more separate pieces, as noted above. The term "support structure," as used in this specification, may refer to a support structure for one tank 50 or may refer to a support structure for tanks on both sides of the tractor body 10. Similarly, the term "body engaging structure" may be used in this specification to refer to a structure that attaches a support structure 24 for a tank 50 to one side of the tractor body 10 or to a structure that attaches support structures 24 to the tractor body 10 from both sides of the tractor body 10.

The support structure 24 may contain a step 52 on one or both sides of the tractor body 10. In the embodiments of FIGS. 1 and 2, the step 52 exists on one side of the tractor body 10 so that a tractor operator may easily step up into the operating compartment (not shown) of the tractor. In the embodiments of FIGS. 1 and 2, the step 52 is rigidly attached to the body engaging structure 48, although in other embodiments the step 52 could be attached in other locations, such as on the inner arm 30 or on a tank 50 mounted in the support structure 24.

The dimensions of the various components described above may vary. In one embodiment, the support structure 24 may be approximately 26 inches wide (the distance between an outer edge of arm 30 and an outer edge of arm 32), and the length of the support structure may be approximately 81½ inches (distance from an outer edge of the tube 28 and an outer edge of the body engaging structure 48). In addition, the spindle 22 may be approximately 30 inches long. It should be noted that these dimensions may vary widely in differing embodiments of the invention that fall within the scope of this invention, and the dimension of other components described above may also vary widely.

b. Operation of the Invention

In one embodiment of a method of the invention for mounting tanks to the rear axle 14 of a tractor, the drums 20 are attached to the rear axle 14 of the tractor, the spindles 22 are attached to the drums 20 so that the drums 20 can rotate with respect to the spindles 22, and tanks 50 are mounted to the support structure 24 substantially adjacent the rear tires 12 of the tractor so that the rear tires 12 of the tractor bear a majority of the weight of the tanks 50. As noted above, drums 20, spindles 22, and support structures 24 may be attached to each end of the rear axle 14 so that tanks 50 may be mounted on each side of the tractor body 10. In one embodiment, the tractor could be converted into a self-propelled sprayer with the addition of the support structure 24 and tanks 50 of the invention and a rear mounted boom.

The mounting apparatuses and methods of the invention described above provide numerous benefits over the prior art. One advantage of the present invention as described above is that it enables a substantial portion or a majority of the weight of the tanks 50 to be carried by the rear axle 14 and tires 12 of the tractor, thus alleviating the stress cause by large weights on the front axle 18 and tires 16 of the tractor. The tanks 50 of the invention may extend over and to the rear axle 14 of the tractor, and approximately 75 percent of the weight of the tanks 50 may be on the rear axle 14 and tires 12 in one embodiment. In other embodiments, over 75 percent or less than 75 percent of the weight of the tanks 50 may be on the rear axle 14 and tires 12. In the embodiment shown in FIG. 2, a tank 50 may be shaped such that it has an extending portion 90 that extends beyond the longitudinal axis x of the rear axle 14, thus placing more of the weight of the tank 50 on the rear axle 14 rather than on the front axle 18. In other embodiments, the support structure 24 itself may extend toward the rear of the tractor such that the tank 50 may be mounted with a greater portion of its weight on the rear axle 14. Another advantage of the above embodiments of the invention is that the tanks 50 may be increased in size due to the weight distribution of the tanks 50 on the rear axle 14 and front axle 18 (a substantial portion of the weight being on the rear axle 14). The increased size of the tanks 50 allows the tractor operator to work more efficiently by requiring less time for refueling (if the tanks 50 are used for fuel) or for re-supplying chemicals (if the tanks are used to carry and apply chemicals).

In one embodiment, the tanks 50 may be mounted substantially on the outer side of the rear tires 12 of the tractor. Although in other embodiments the support structure 24 may extend vertically from the drum 20 and spindle 22 so that the tanks 50 may be mounted over the rear tires 12, it may be desirable in some applications to mount the tanks 50 to the side of the tires 12. If the tanks 50 are mounted above the rear tires 12, the tractor operator will have decreased visibility because the tanks 50 will obstruct views to the side of the tractor. If the tanks 50 are mounted to the outer side of the rear tires 12, as shown in FIGS. 1 and 2, the tanks 50 will not obstruct the tractor operator's view. If the distance of the tube 28 (which may also be the distance between the arms 30, 32) is kept to a small enough width (such as 26 inches in one embodiment), the transport width of the tractor may be kept to within acceptable design parameters while allowing the weight of the tanks 50 to be supported substantially by the rear axle 14. An additional benefit of mounting the tanks 50 to the side of the rear tires 12 is to make it easier for the tractor operator to enter the cab of the tractor, which could be more difficult if the tanks 50 are mounted above the rear tires 12.

The accompanying Figures depict embodiments of the mounting apparatuses of the present invention, and features and components thereof. With regard to means for fastening, mounting, attaching or connecting components of the present invention to form the invention as a whole, unless specifically described otherwise, such means are intended to encompass conventional fasteners such as machine screws, machine threads, seals, snap rings, clamps, rivets, nuts and bolts, toggles, pins and the like, and bearings. Components may also be connected adhesively, by friction fitting, or by welding or deformation, if appropriate. Unless specifically otherwise disclosed or taught, materials for making components of the present invention are selected from appropriate materials such as metal, metallic alloys, stainless steel, natural or synthetic materials, plastics and the like, either rigid or soft, and appropriate manufacturing or production methods including casting, extruding, molding and machining may be used. In addition, any type of bearings known to those skilled in the art may be used within the scope of the invention. The dimensions of the components of the invention may also vary widely without departing from the scope of the invention.

Any references to front and back, right and left, top and bottom, upper and lower, and horizontal and vertical are intended for convenience of description, not to limit the present invention or its components to any one positional or spacial orientation. All dimensions of the components in the attached Figures may vary with a potential design and the intended use of an embodiment of the invention without departing from the scope of the invention.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims.

What is claimed is:

1. An apparatus for mounting a tank to a tractor, comprising:
   (a) a drum attachable to a rear axle of the tractor, the rear axle having a longitudinal axis of rotation;
   (b) a spindle connectable to the drum along the longitudinal axis of the rear axle so that the drum can rotate with respect to the spindle; and
   (c) a support structure connected to the spindle and connectable to the body of the tractor, wherein the support structure is adapted to mount a tank substantially adjacent a rear wheel of the tractor.

2. The apparatus of claim 1 wherein the drum is fixedly attached to the rear axle of the tractor through a rear wheel rim of the tractor.

3. The apparatus of claim 2 wherein the spindle is connected to the drum through a bearing.

4. The apparatus of claim 3 wherein the bearing is a hub rotatably connected to the drum and fixedly attached to the spindle.

5. The apparatus of claim 3 wherein the bearing is a hub fixedly attached to the drum and rotatably connected to the spindle.

6. The apparatus of claim 3 wherein the support structure comprises a tube mounted over the spindle and an arm.

7. The apparatus of claim 6 wherein the tube is mounted to the spindle with a set screw.

8. The apparatus of claim 6 wherein the support structure includes two arms spaced from each other, each of the two arms being attached to the tube, and each arm extending in a substantially perpendicular direction from the spindle and substantially parallel to the body of the tractor.

9. The apparatus of claim 8 wherein the support structure further comprises a body engaging support, wherein first ends of the two arms are attached to the tubes and second ends of the two arms are attached to the body engaging support, and wherein the body engaging support attaches to the body of the tractor.

10. The apparatus of claim 9 further comprising a step attached to the body engaging support.

11. The apparatus of claim 9 wherein the tank is mounted on the support structure between the two arms, the tube, and the body engaging support.

12. An apparatus for mounting a tank to a rear axle of a tractor, comprising:
   (a) a first drum attachable to a first end of the rear axle and a second drum attachable to a second end of the rear axle, the rear axle having a longitudinal axis of rotation;
   (b) a first spindle connectable to the first drum along the longitudinal axis of the rear axle so that the rear axle can rotate with respect to the first spindle, and a second spindle connectable to the second drum along the longitudinal axis of the rear axle so that the rear axle can rotate with respect to the second spindle; and
   (c) a support structure connected to the first spindle, the second spindle, and the tractor body, wherein the support structure is adapted to mount a first tank substantially adjacent a first rear wheel of the tractor and a second tank substantially adjacent a second rear wheel of the tractor.

13. The apparatus of claim 12 wherein the first and second tanks are mounted partially along a side of the first rear wheel and the second rear wheel.

14. The apparatus of claim 12 wherein the first and second tanks are mounted partially above the first rear wheel and the second rear wheel.

15. The apparatus of claim 12 wherein the support structure is mounted to the tractor body between the rear axle and a front axle of the tractor.

16. The apparatus of claim 15 wherein the support structure includes a step for a tractor operator.

17. A method for mounting a tank to the rear axle of a tractor, comprising:

(a) attaching a drum to the rear axle;

(b) connecting a spindle to the drum such that the drum can rotate with respect to the spindle, wherein a support structure is connected to the spindle; and (c) mounting a tank to the support structure substantially adjacent a rear wheel of the tractor so that the rear wheels of the tractor bear a majority of the weight of the tank.

18. The method of claim 17 wherein the act of attaching a drum comprises attaching a drum to a rear wheel rim of the tractor, the rear wheel rim being attached to the rear axle.

19. The method of claim 17 wherein the act of connecting comprises attaching a hub to the drum, wherein the hub rotates with respect to the drum, and connecting the hub to the spindle.

20. The method of claim 17 wherein the act of connecting comprises fixedly attaching a hub to the drum and connecting the hub to the spindle so that the spindle rotates with respect to the hub.

* * * * *